United States Patent
Morin

(10) Patent No.: US 10,047,732 B2
(45) Date of Patent: Aug. 14, 2018

(54) ELECTROTHERMAL DEVICE FOR A PROPULSION SYSTEM, ESPECIALLY FOR A TURBOJET, PROPULSION SYSTEM COMPRISING SUCH AN ELECTROTHERMAL DEVICE, AND ASSOCIATED METHOD

(71) Applicant: Xavier Morin, Luxembourg (LU)

(72) Inventor: Xavier Morin, Luxembourg (LU)

( * ) Notice: Subject to any disclaimer, the term of this patent is extended or adjusted under 35 U.S.C. 154(b) by 530 days.

(21) Appl. No.: 14/423,837

(22) PCT Filed: Aug. 26, 2013

(86) PCT No.: PCT/EP2013/067637
§ 371 (c)(1),
(2) Date: Feb. 25, 2015

(87) PCT Pub. No.: WO2014/033091
PCT Pub. Date: Mar. 6, 2014

(65) Prior Publication Data
US 2015/0211499 A1   Jul. 30, 2015

(30) Foreign Application Priority Data
Aug. 28, 2012 (FR) ..................... 12 58040

(51) Int. Cl.
*F03H 1/00* (2006.01)
*B64G 1/40* (2006.01)
(Continued)

(52) U.S. Cl.
CPC .......... *F03H 1/0093* (2013.01); *B64G 1/406* (2013.01); *F02C 1/00* (2013.01); *F02K 99/00* (2013.01);
(Continued)

(58) Field of Classification Search
CPC ........ F03H 1/00; F03H 1/0006; F03H 1/0012; F03H 1/0018; F03H 1/0025;
(Continued)

(56) References Cited

U.S. PATENT DOCUMENTS 3,071,705 A * 1/1963 Coleman .................. F03H 1/00
310/10
3,226,592 A * 12/1965 Gough ..................... F03H 1/00
219/121.48

(Continued)

FOREIGN PATENT DOCUMENTS

CA        2 019 587 A1    9/1991

OTHER PUBLICATIONS

Goldman, The corona discharge its properties and specific uses, 1986, Pure and Applied Chemistry.*

(Continued)

*Primary Examiner* — William H Rodriguez
*Assistant Examiner* — William Breazeal
(74) *Attorney, Agent, or Firm* — Young & Thompson

(57) ABSTRACT

An electrothermal device (1, 100) includes a primary chamber (2) having an anode nozzle (6) provided with an inlet passage (7), a cathode tip (9) at least partially inserted into the inlet passage (7), and a primary air inlet (10) leading into the inlet passage (7), and a voltage generator (11) arranged between the anode nozzle (6) and the cathode tip (9) in such a way as to generate an electric arc (12) on the path of the primary air flow (13) injected into the primary chamber (2). It includes a secondary chamber (3) wherein a secondary air flow (15) circulates in a heat exchange relation with the heated primary air flow (14) from the primary chamber (2), the secondary air flow (15) having a lower temperature than the heated primary air flow (14) leaving the primary chamber (2).

20 Claims, 3 Drawing Sheets

(51) Int. Cl.
*F02K 99/00* (2009.01)
*F02C 1/00* (2006.01)

(52) U.S. Cl.
CPC ..... *F03H 1/0012* (2013.01); *F05D 2220/323* (2013.01)

(58) Field of Classification Search
CPC .... F03H 1/0031; F03H 1/0037; F03H 1/0043; F03H 1/005; F03H 1/0056; F03H 1/0062; F03H 1/0068; F03H 1/0075; F03H 1/0081; F03H 1/0087; F03H 1/0093; B64G 1/404; B64G 1/405; B64G 1/406; B64G 1/407; B64G 1/408; B64G 1/409; F05D 2220/323; F02K 99/00; F02C 7/266
See application file for complete search history.

(56) References Cited

U.S. PATENT DOCUMENTS

| | | | |
|---|---|---|---|
| 3,593,525 A * | 7/1971 | Holmes | F02K 9/82 239/127.3 |
| 4,882,465 A | 11/1989 | Smith et al. | |
| 6,145,298 A * | 11/2000 | Burton, Jr. | H01J 27/26 313/359.1 |
| 6,357,700 B1 * | 3/2002 | Provitola | B64B 1/00 244/171.1 |
| 2003/0046921 A1 | 3/2003 | Hruby et al. | |

OTHER PUBLICATIONS

International Search Report, dated Sep. 27, 2013, from corresponding PCT application.

\* cited by examiner

ELECTROTHERMAL DEVICE FOR A PROPULSION SYSTEM, ESPECIALLY FOR A TURBOJET, PROPULSION SYSTEM COMPRISING SUCH AN ELECTROTHERMAL DEVICE, AND ASSOCIATED METHOD

The invention concerns propulsion systems, notably but not exclusively turbojets, and relates more particularly to a thermoelectric device for such a propulsion system.

Aircraft often use jet propulsion systems, referred to as turbojets, based on the use of chemical energy such as energy from kerosene. The thrust generated by a thermochemical thermojet results from the acceleration of air between the inlet formed by an air intake duct and the outlet formed by a nozzle. The acceleration is produced by the combustion of a mixture comprising for example kerosene and compressed air. Igniting the mixture makes it possible to expand greatly the gases, which escape from the turbojet via the nozzle which, by virtue of its convergent section, increases the speed of the air. Some of the energy produced is recovered at the exit from the nozzle by a turbine coupled to a compressor placed at the inlet of the turbojet enabling compression of the air entering the combustion chamber.

The variation in the speed of the air between the inlet and the outlet of the jet engine creates a quantity of movement, or thrust, toward the rear of the turbojet which, by reaction, generates a movement toward the front of the turbojet and therefore of the aircraft equipped with the turbojet.

Various problems arise with this type of chemical propulsion. These problems are mainly linked to incomplete combustion of the kerosene, to filtering and pumping the kerosene, to the emission of carbon dioxide and other pollutant particles, and to the risks inherent in the use of a fluid (for example fire, release of toxic gases, etc.). The major disadvantage linked to the use of a thermochemical turbojet concerns the use of energy from fossil fuel to generate sufficient thrust.

Aerospace craft such as space satellites include a plurality of propulsion systems. One of the propulsion systems is an electrical propulsion system used only for maneuvers in space, the thrust for injection into orbit generally being generated by a thermochemical propulsion system.

The electrical propulsion systems used may be electrothermal propulsion systems, i.e. systems based on the transformation of electrical energy into thermal energy, capable, on the one hand, of converting electrical energy into thermal energy by transfer of heat between an electric arc and a propellant fluid and, on the other hand, of converting thermal energy into kinetic energy by expansion of the heated fluid through a nozzle to generate a thrust.

An "arcjet" type electrothermal propulsion system onboard a satellite uses electrical energy generally supplied by solar panels to generate an electric arc that reacts with the propellant fluid to increase its temperature.

This type of thermoelectric propulsion has the advantage over thermochemical propulsion of avoiding carrying heavy fossil fuel energy of lower combustion efficiency. In fact, electrical energy can be supplied from any appropriate source of electrical energy, for example power supply batteries.

Most electrothermal propulsion systems include an anode in the form of a nozzle biased positively and a cylindrical cathode having a conical end biased negatively. The anode and the cathode are held close to each other, separated by an insulator. The nozzle defines an expansion chamber including a narrow passage in a rear portion and a divergent opening in a front portion. The cathode is aligned with the longitudinal axis of the anode nozzle, the conical end of the cathode extending in the narrow passage of the expansion chamber.

The jet engine is filled with a gas, or propellant fluid, and a high voltage is applied between the cathode and the anode in such a way as to generate an electric arc. The electric arc generated between the electrodes ionizes the gas in such a way as to maintain a plasma and therefore a conduction channel between the cathode and the anode, until the gas reaches a high temperature, the increase in the temperature and the pressure of the gas causing expansion and consequently acceleration of the propellant gas.

The electrothermal propulsion system generally used have limited efficacy. The efficiency is in fact less than 50%, that is to say less than half the electrical energy is converted into kinetic energy, the residual energy being lost in the form of heat energy and ionized particles.

The heat energy losses that present only part of the initial electrical energy. Efficacy is in fact limited mainly by losses by ionization and dissociation of the particles known as "frozen flows". These losses stem from ionization or dissociation or more generally passage of the particles to excited molecular states trapping part of the energy. These losses occur when the gas or the propellant fluid is heated to a high temperature by the electric arc before being ejected via the nozzle. In standard electric arc electrothermal propulsion units, the heated propellant fluid remains for too short a time in the high-pressure areas at lower temperatures, in this instance the expansion chamber, to enable recombination of the atoms or de-excitation of the excited molecules.

Consequently, the energy of the ions and molecules still in the excited state is lost and not available for the thrust of the jet engine.

In addition to these losses in the jet engine, the usual electric arc propulsion units do not tolerate large variations in the propellant fluid as the arc may be "blown out" by too great a flow of propellant fluid, breaking the conduction channel formed by the plasma.

There is known from the document U.S. Pat. No. 4,882,465 an electric arc electrothermal propulsion system intended for the propulsion of satellites only for maneuvers in space. This system includes secondary injection of propellant fluid to reduce the losses caused by the "frozen flows" and to improve propulsion efficacy.

However, this type of propulsion is generally used only for maneuvering satellites because the thrust generated by such a propulsion unit remains low because of the lack of propellant fluid mass. Moreover, a secondary flow of propellant fluid is injected via a passage formed in the anode, making the manufacture of the anode complex.

In fact, known electric arc propulsion systems cannot generate sufficient thrust for the propulsion of an aerospace craft, notably an aeronautical craft, in particular in an atmospheric environment, such as an aircraft. The thrust is limited by the quantity of gas ejected and by the losses, the quantity of gas entering the narrow passage being limited because of the risk of the electric arc being "blown out" in the narrow passage.

The invention proposes to solve the problems mentioned above and to enable heating of a relatively large flow of air to enable the propulsion of an aerospace or aeronautical craft whilst avoiding high losses.

In accordance with one aspect of the invention, there is proposed an electrothermal device for a propulsion system, including a primary chamber including an anode nozzle provided with an inlet passage, a cathode spike at least partially inserted into the inlet passage, a primary air inlet leading into the inlet passage, and a voltage generator disposed between the anode nozzle and the cathode spike in such a way as to generate an electric arc on the path of the primary air flow injected into the primary chamber.

In accordance with a general feature of the invention, the device includes a secondary chamber in which a secondary air flow circulates in a heat exchange relationship with the heated primary air flow from the primary chamber, the secondary air flow having a lower temperature than the heated primary air flow at the outlet of the primary chamber.

The primary chamber therefore supplies a heated first air flow at a high temperature enabling by heat exchange heating of the secondary air flow routed via the secondary combustion chamber. When it is integrated into a propulsion system, for example a turbojet, this device therefore makes it possible to obtain a high flow of heated air, notably before entry into the turbine of the turbojet. This makes it possible to reduce the "frozen flows" losses from the primary air flow at the same time as enabling heating of a relatively high gas flow without "blowing out" the arc.

Moreover, the secondary air flow having a temperature lower than the temperature of the heated primary air flow, the interaction between the two flows makes it possible to reduce the energy losses of the heated primary air flow caused by "frozen flows". The lower temperature of the secondary air flow encourages the excited ions and molecules of the heated primary air flow to become de-excited and to recombine, and consequently to give off additional radiant energy, notably for heating the secondary flow. The efficiency of the heating by the electrical arc is therefore significantly increased by the interaction between the cold secondary air flow and the heated primary air flow.

The electrothermal device advantageously includes means for separating a compressed air flow into a primary air flow and a secondary air flow.

When the device is integrated into a turbojet, in separating a compressed air flow in this way by the inlet compressor of the turbojet, the portion of the compressed air flow bled off to form the primary air flow injected into the primary chamber may be sized to maximize the heated primary air flow without risk of blowing out the electric arc generated in the primary chamber by too great a flow. The rest of the compressed air flow is used to form the secondary air flow.

The secondary chamber preferably includes the primary chamber. It may be directed so as to bleed off a portion of the compressed air flow entering the secondary chamber and to deliver the heated primary air flow in the same direction as the secondary air flow.

Alternatively, the primary chamber leads orthogonally into the secondary chamber in such a way that the heated primary air flow is orthogonal to the secondary air flow, in such a way as to increase the heat exchange section.

The electrothermal device may advantageously further include at least one additional primary chamber adapted to deliver an additional primary air flow heated by an electric arc generated by a voltage generator on the path of the first additional air flow injected into the additional primary chamber, the additional chamber being in a heat exchange relationship with the secondary air flow.

Adding additional primary chambers makes it possible to increase the number of primary chambers in heat exchange relationship with the secondary chamber, which makes it possible either to increase the mean temperature of the air flow at the outlet of the electrothermal device or to increase the dimensions of the secondary air flow for the same temperature of the air flow at the outlet of the combustion device.

The invention also consists in a propulsion system including an electrothermal device as defined hereinabove for generating a propellant gas flow.

In accordance with another aspect of the invention, there is proposed an aerospace or aeronautical craft including an at least one propulsion system as defined above.

In accordance with a further aspect of the invention, there is proposed a method of electrothermal treatment of air in a propulsion system, including the injection of a primary air flow into a primary chamber and the generation of an electric arc on the path of the primary air flow injected into the primary chamber.

A secondary air flow is injected into a secondary chamber in heat exchange relationship with the heated primary air flow in the primary chamber, the secondary air flow having a lower temperature than the heated primary air flow at the outlet of the primary chamber.

A compressed air flow is advantageously separated into a primary air flow and a secondary air flow, the secondary air flow being greater than the primary air flow.

The heated primary air flow is preferably injected in the direction of the secondary air flow to maximize the quantity of air flow in the exit direction of the electrothermal device.

At least one additional primary air flow is advantageously injected into an additional primary chamber, the additional primary air flow is advantageously heated by means of an electric arc generated in the additional primary chamber, the heated additional primary air flow advantageously being in heat exchange relationship with the secondary air flow.

Other advantages and features of the invention will appear on examining the detailed description of nonlimiting embodiments and one nonlimiting application of the invention and the appended drawings, in which.

Figure 1:
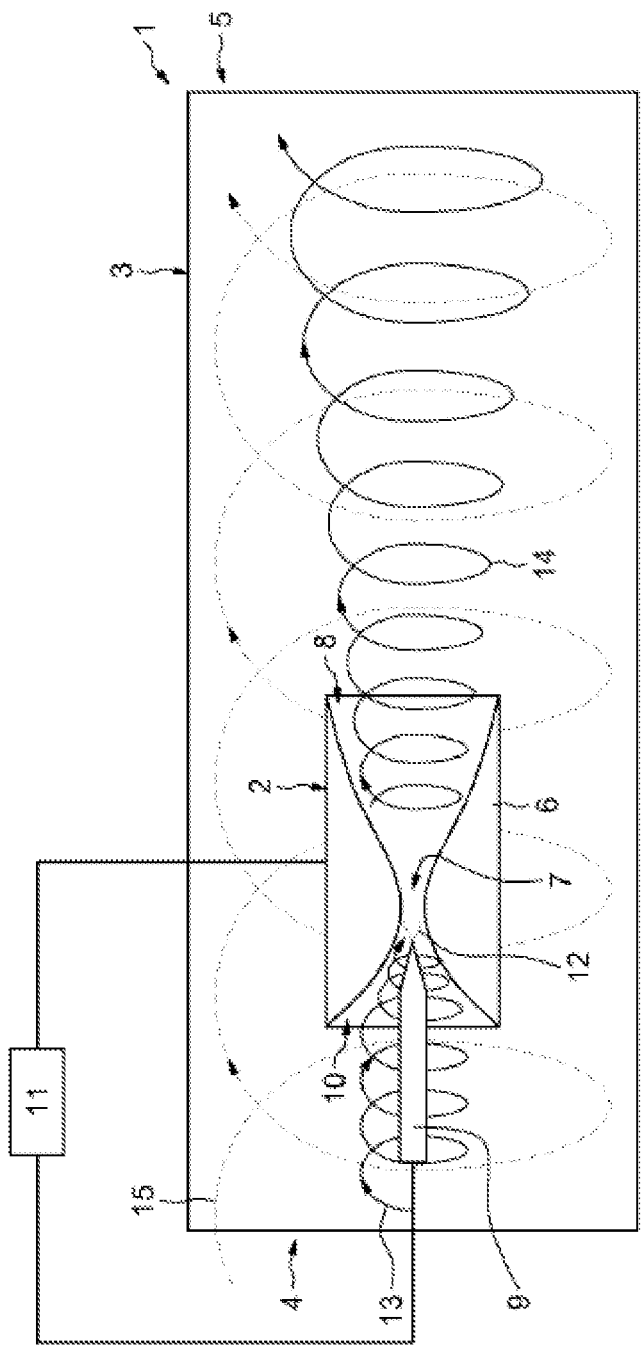
FIG. 1 shows diagrammatically a sectional view of an electrothermal device in accordance with a first embodiment of the invention.

FIG. 1 shows diagrammatically a sectional view of a first embodiment of an electric electrothermal device in accordance with the invention. The electrothermal device is intended to be integrated into a jet propulsion system, notably for aerospace craft, including aeronautical craft, for movement in the atmosphere, or astronautical craft for movement in space, and constitutes a propulsion system intended, in operation, to generate a thrust caused by acceleration of a gas between the inlet and the outlet of the device.

The electrothermal device 1 includes a primary chamber 2 mounted inside a secondary chamber 3, the secondary chamber 3 having dimensions greater than those of the primary chamber 2.

The secondary chamber 3 includes an air inlet opening 4 allowing injection of a propellant fluid, such as air, and an exhaust outlet 5 allowing expulsion of air from the secondary chamber 3, and consequently from the electrothermal device 1.

The primary chamber 2 constitutes a primary heating chamber for heating a portion of the air admitted at the inlet of the device. It includes an anode 6 here in the form of a nozzle including an inlet passage 7 and an expansion opening 8. It will nevertheless be noted that it is not outside the scope of the invention for the anode to have a profile of rectilinear shape and not curved to form a nozzle. The inlet passage 7 has a narrower section than the rest of the anode 6. The primary chamber 2 also includes a cathode 9 in the form of a spike with a cylindrical body and a conical tip. The cathode 9 is aligned with the longitudinal axis of the anode nozzle 6. The cathode 9 is inserted into the primary chamber in such a way that the conical tip is situated in the vicinity of the inlet passage 7.

The primary chamber 2 further includes an air inlet 10 facing the air inlet opening 4 of the secondary chamber 3 and leading into the inlet passage 7.

The primary chamber 2 also includes a current generator 11 electrically connected between the anode nozzle 6 and the cathode 9. The current generator 11 is configured to apply a potential difference between the negatively biased cathode 9 and the positively biased anode 6 and thus to generate an electric arc 12 in the inlet passage 7 between the tip of the cathode 9 and the anode nozzle 6.

The electric arc 12 is therefore generated on the trajectory of the primary air flow 13 injected into the primary chamber 3 via the air inlet 10 as far as the inlet passage 7. The electric arc 12 is for ionizing the primary air flow 13 and creating a plasma for heating the primary air flow 13 passing through the inlet passage 7. A heated primary air flow 14 then escapes via the expansion opening 8.

The primary air flow 13 injected into the primary chamber 2 is injected with a swirling trajectory initiated for example by the rotating blades of a compressor based on the upstream side of the electrothermal device 1. The swirling trajectory of the primary air flow 13 makes it possible to increase the quantity of air interacting directly with the electric arc 12 and therefore to optimize the heating of the secondary air flow 15 without increasing the flow and the risk of blowing out the electric arc 12. Of course, primary air could instead be injected along a straight or rectilinear trajectory.

The secondary chamber 3 receives a secondary air flow 15 via the air inlet opening 4 that is mixed with the heated primary air flow 14 at the outlet of the primary chamber 2. The secondary chamber 3 then constitutes a secondary heating chamber heating a portion of the air flow admitted via the opening 4 but not bled off by the primary chamber, by virtue of the action of the heated primary air flow 14. The secondary air flow 15 also has a swirling trajectory initiated by the blades of a compressor, for example. The swirling trajectory makes it possible to improve the mixing between the heated primary air flow 14 and the secondary air flow 15, increasing the distance, and therefore the area, of interaction between the two flows 14 and 15. Injection of secondary air along a straight trajectory could alternatively be provided.

Clearly, the heating of the flow delivered to the exhaust outlet 5 resulting from the mixing of the primary air flow 13 and the secondary air flow 15 makes it possible to increase the pressure, and consequently the speed, of the outlet flow.

In this first embodiment, the primary air flow 13 is produced by using the air inlet 10 to bleed off a portion of the secondary air flow 15 admitted into the device 1 at the level of the inlet opening 4.

Figure 2:
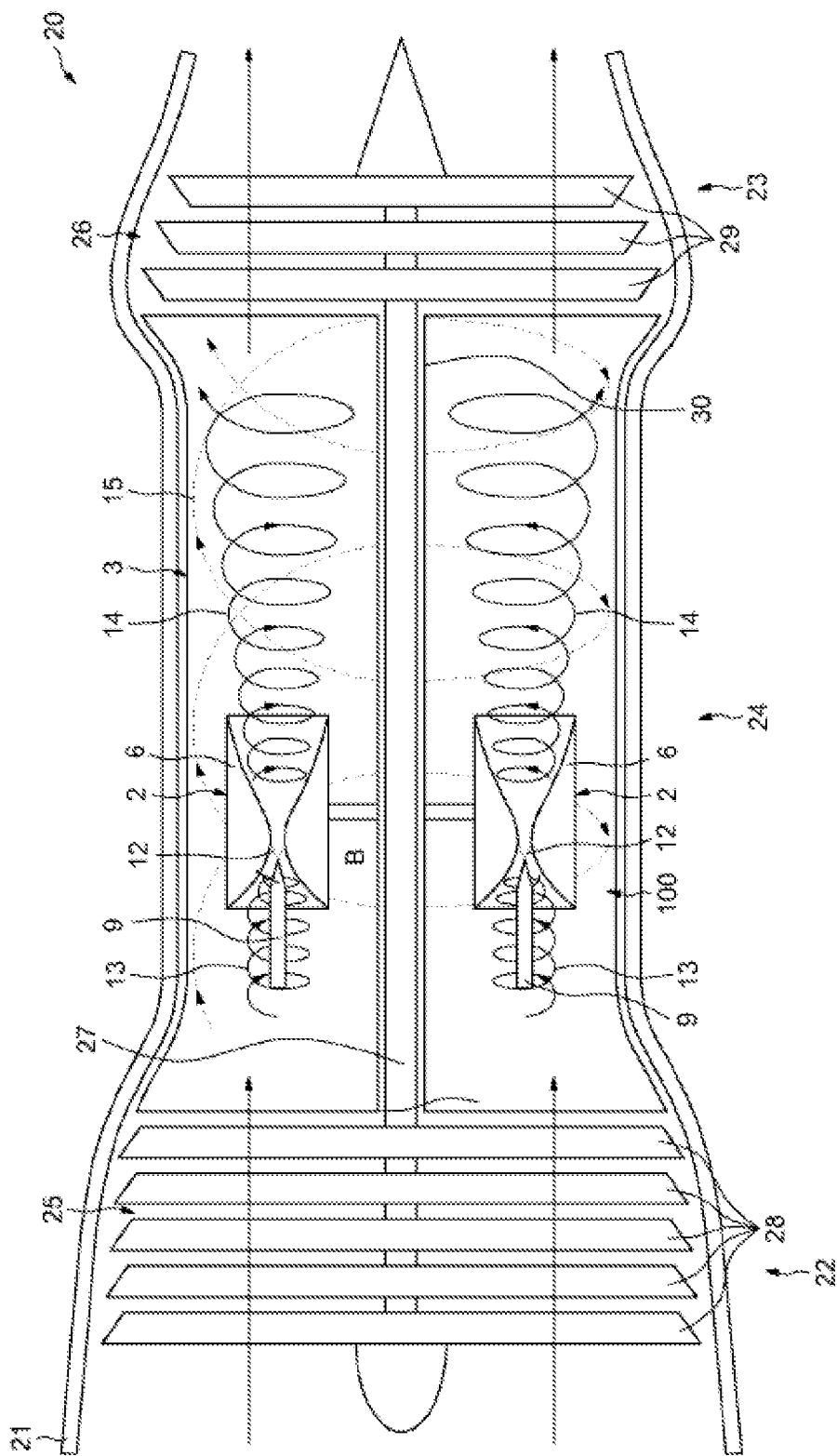
FIG. 2 shows diagrammatically a sectional view of a turbojet including an electrothermal device in accordance with a second embodiment of the invention.

FIG. 2 shows diagrammatically a sectional view of a turbojet including an electrothermal propulsion device in accordance with one embodiment of the invention.

The electrothermal turbojet 20 includes an enclosure 21 including an inlet stage 22 and an outlet stage 23 separated by a heat treatment stage 24. The inlet stage 22 includes a compressor 25 and the outlet stage 23 includes a turbine 26. The turbine 26 is mechanically coupled to the compressor 25 by a transmission shaft 27. In this embodiment, the compressor 25 includes a plurality of compression spools 28 in such a way as to increase the compression factor and thereby to increase the quantity of compressed air injected into the combustion stage 24. In the same way, the turbine 26 includes a plurality of spools 29 for increasing the quantity of air expelled and the force transmitted by the transmission shaft 27 to the compressor 25 via the transmission shaft 27.

Although the combustion stage 24 can be equipped with a device 1 as described above with reference to FIG. 1, here it is provided with an electrothermal device 100 in accordance with a second embodiment of the invention. The elements of the electrothermal device 100 in accordance with the second embodiment identical to the electrothermal device 1 in accordance with the first embodiment bear the same reference numbers. As in the embodiment described above, the electrothermal device 100 is for effecting heat treatment of the air admitted at the inlet to generate an increase in the pressure of the gas and its expansion as well as its consequent acceleration to generate thrust at the outlet.

The electrothermal device 100 in accordance with the second embodiment differs from the electrothermal device 1 in accordance with the first embodiment in that it includes two primary chambers 2 disposed in a single cylindrical/annular secondary chamber 3.

The two primary chambers 2 are disposed on either side of the transmission shaft 27 and each is mounted on an arm B fixed to a sleeve 30 disposed around the transmission shaft 27 and delimiting the radially internal wall of the secondary chamber 3. The sleeve 30 is independent of the transmission shaft 27 so as to remain fixed when the transmission shaft 27 is rotated. This makes it possible to generate two heated primary air flows 14 distributed on either side of the transmission shaft 27 and therefore to increase the quantity of heated primary air for heating the secondary air flow 15, the temperature of which is lower than that of the heated primary air flows 14.

In this embodiment, the primary air flows 13 entering the primary chambers 2 are bled from the compressed air flow delivered by the compressor 25, the compressed air flow that is not bled off forming the secondary air flow 15 circulating in the secondary chamber 3. In the second embodiment, the primary air flows 13 and the secondary air flow 15 are therefore at the same initial temperature at the inlet of the electrothermal device 100, before being heated.

The secondary air flow 15 is heated by the heated primary air flows 14 at the outlet of the primary chambers 2. The primary and secondary heated air flows 14 and 15 mixed in this way are then delivered to the spools 29 of the turbine 26 that are rotated and drive the compressor 24 of the inlet stage 22 via the transmission shaft 27.

The electrical energy generating the electric arcs 12 between the anodes 6 and the cathodes 9 is converted into heat energy in the primary chambers 2. This heat energy is transferred via the heated primary air flows 14 to the secondary air flow 15 so as to generate a heated outlet air flow. As indicated above, the addition of heat energy to the outlet air flow generates a significant increase in the kinetic energy, the temperature difference between the inlet and the outlet of the turbojet 20, that is to say between the inlet stage 22 and the outlet stage 23, generating an air pressure and speed difference leading to the appearance of a thrust force toward the front of the turbojet 20 that is added to the force generated by the air flow.

In another embodiment, it is possible to envisage a turbojet including an electrothermal device including more than two primary chambers so as to increase the quantity of heated primary air flow.

It is also possible to envisage a turbojet including only one primary chamber. In this case, a hollow transmission shaft will be provided into the interior of which is injected the compressed air flow delivered by the compressor, the hollow shaft including an electrothermal device with a central primary chamber.

Figure 3:
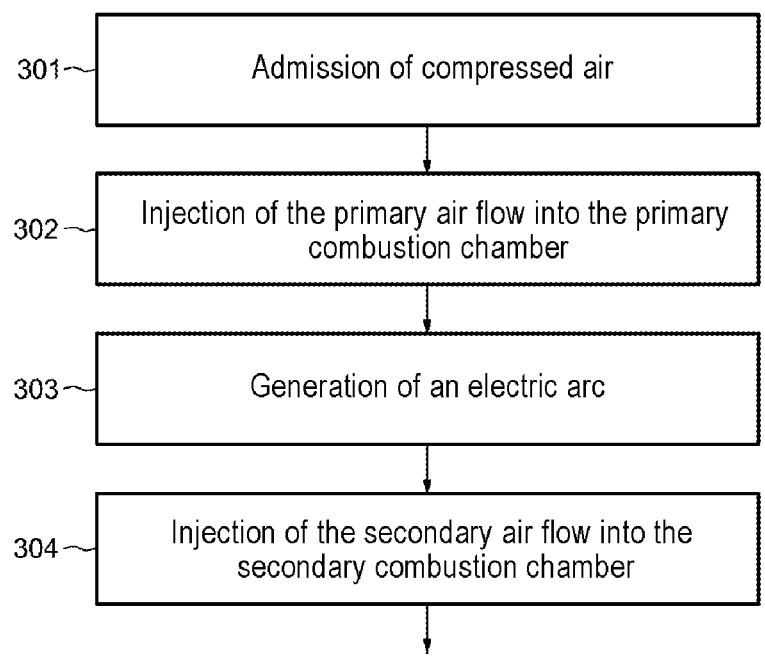
FIG. 3 shows a flowchart of a method of electrothermal treatment of air in one application of the invention.

FIG. 3 shows a flowchart of a method of electrothermal treatment of air drawn into a turbojet in accordance with one application of the invention.

The electrothermal treatment method includes in a first step 301 the admission of a compressed air flow into an electrothermal device including a primary heat treatment chamber 2 disposed in a secondary heat treatment chamber 3.

In a next step 302, a portion 13 of the compressed air flow admitted into the electrothermal device is bled off and this primary air flow 13 is injected into the primary chamber 2.

Then, in a step 303, an electric arc 12 is generated on the path of the primary air flow 13 injected into the primary chamber 2 so as to ionize the air and form a plasma for heating the primary air flow 13 and thus forming a heated primary air flow 14.

In a next step 304, a secondary air flow 15 is injected into a secondary chamber 3, the secondary air flow 15 being formed from the compressed air flow remaining after the bleeding effected in the step 302 to form the primary air flow 13. The secondary air flow 15 is then at a temperature lower than the temperature of the heated primary air flow 14.

The secondary chamber 3 is such that the secondary air flow 15 is in a heat exchange relationship with the first heated air flow 14 when the latter leaves the primary chamber 2. This exchange of heat on the one hand makes it possible to reduce the energy losses caused by "frozen flows", the lower temperature of the secondary air flow 15 forcing the recombination of the molecules and the ions in excited states at the outlet of the primary chamber 2. On the other hand, the exchange of heat between the heated primary air flow 14 and the secondary air flow 15 also makes it possible to heat the secondary air flow 15 and therefore to obtain at the outlet of the electrothermal device an outlet air flow having a temperature higher than the temperature of the inlet compressed air flow.

The outlet air flow can then be delivered to a turbine of a turbojet to drive the transmission shaft connecting the compressor 25 to the turbine 26 before being expelled from the turbojet 20 and generate a thrust force toward the front of the turbojet 20.

Thus the invention provides an electrothermal device capable of heating a relatively large flow of air to enable the propulsion of an aerospace craft. The electrothermal device makes it possible to increase the energy efficiency of an electric arc electrothermal treatment chamber and to increase the quantity of air heated in a turbojet.

It will further be noted that, by reducing the speed of the primary flow, the electrothermal device that has just been described makes it possible to increase the time for which the flow of air exhibits conditions favorable to recovery of the "frozen flows", that is to say losses by ionization and dissociation of the particles.

It will finally be noted that the invention is not limited to the embodiments described above.

In fact, in the embodiments described with reference to FIGS. 1 and 2, the heat treatment primary chamber 2 opens onto the axis of the heat treatment secondary chamber.

It would alternatively be possible to orient the primary treatment chamber differently so that it is oriented orthogonally to the secondary chamber so that the heated primary air flow is orthogonal to the secondary air flow in order to increase the heat exchange section between the primary and secondary air flows.

The invention claimed is:

1. An electrothermal device that generates a thrust, comprising:
   a primary chamber including:
   i) a convergent inlet section comprised of an air inlet provided with an air inlet opening and an air inlet exit, an area for fluid flow of the air inlet decreasing from the air inlet opening to the air inlet exit, and
   ii) an anode nozzle provided with an inlet passage connected to an expansion opening, the inlet passage having an inlet passage inlet and an inlet passage outlet, an area for fluid flow of the expansion opening increasing from an inlet of the expansion opening located at the inlet passage outlet to an outlet of the expansion opening located at an outlet of the primary chamber, the air inlet exit leading to the inlet passage inlet, wherein a minimum cross-section diameter of the inlet passage is less than a cross-section diameter of the air outlet exit of the air inlet and less than a cross-section diameter of the inlet of the expansion opening;
   a cathode spike with a tip at least partially inserted beyond the inlet passage inlet into the inlet passage;
   a voltage generator disposed between the anode nozzle and the cathode spike, the voltage generator configured to generate an electric arc between the inlet passage inlet and the inlet passage outlet between the tip of the cathode spike and the inlet passage of the anode nozzle on a path of a primary air flow injected into the primary chamber via the air inlet opening, said electric arc creating a plasma for heating the primary air flow passing through the inlet passage thereby generating a heated primary air flow, the heated primary air flow escaping through the outlet of the expansion opening to the outlet of the primary chamber; and
   a secondary chamber having a secondary air inlet opening for receiving a secondary air flow, wherein a first portion of said secondary air flow is said primary air flow, and an exhaust outlet in which a second portion of said secondary air flow circulates in a heat exchange relationship with the heated primary air flow escaping from the primary chamber, the second portion of said secondary air flow having a lower temperature than the heated primary air flow at the outlet of the primary chamber.

2. The electrothermal device as claimed in claim 1, wherein the primary chamber is mounted inside the secondary chamber, said secondary chamber having dimensions greater than dimensions of the primary chamber.

3. The electrothermal device as claimed in claim 1, wherein the primary chamber extends parallel to the secondary chamber in such a way as to deliver heated air flow in a same direction as the secondary air flow.

4. The electrothermal device as claimed in claim 1, wherein the primary chamber extends perpendicularly to the secondary chamber in such a way as to deliver heated air flow orthogonal to the secondary air flow.

5. The electrothermal device as claimed in claim 1, further including at least one additional primary chamber adapted to deliver a first additional primary air flow heated by another electric arc generated by another voltage generator on a path of the first additional air flow injected into the at least one additional primary chamber, said at least one additional primary chamber being in another heat exchange relationship with the secondary air flow.

6. A propulsion system comprising the electrothermal device as claimed in claim 1.

7. An aerospace craft including at least one propulsion system as claimed in claim 6.

8. The electrothermal device as claimed in claim 2, wherein the primary chamber extends parallel to the secondary chamber in such a way as to deliver heated air flow in parallel to the secondary air flow.

9. The electrothermal device as claimed in claim 2, wherein the primary chamber extends perpendicularly to the secondary chamber in such a way as to deliver heated air flow orthogonal to the secondary air flow.

10. The electrothermal device as claimed in claim 2, further including at least one additional primary chamber adapted to deliver a first additional primary air flow heated by another electric arc generated by another voltage generator on a path of the first additional air flow injected into the at least one additional primary chamber, said at least one additional primary chamber being in another heat exchange relationship with the secondary air flow.

11. The electrothermal device as claimed in claim 1, wherein the primary air flow injected into the primary chamber is injected with a swirling trajectory.

12. The electrothermal device as claimed in claim 11, wherein the secondary air flow injected into the secondary chamber is injected with another swirling trajectory.

13. The electrothermal device as claimed in claim 1, wherein the inlet passage of the anode nozzle has a narrower section than a remaining portion of the anode nozzle.

14. The propulsion system as claimed in claim 6, further comprising:
   an enclosure having an inlet stage and an outlet stage and separated by a heat treatment stage, said inlet stage including a compressor, said outlet stage including a turbine mechanically coupled to the compressor by a transmission shaft,
   wherein the electrothermal device further comprises at least one additional primary chamber adapted to deliver a first additional primary air flow heated by another electric arc generated by another voltage generator on a path of the first additional primary air flow injected into the at least one additional primary chamber,
   wherein the primary chamber and the additional primary chamber are disposed in the secondary chamber in the heat treatment stage, at each side of the transmission shaft, and
   wherein the primary air flow and the additional primary air flow exchange heat with the secondary air flow.

15. A method of electrothermal treatment of air in a propulsion system, including the steps of:
   injecting a primary air flow into a primary chamber of a primary airflow structure with a first overall convergent section, a minimum diameter section, and an overall divergent section that includes
   i) a convergent inlet section comprised of an air inlet provided with an air inlet opening and an air inlet exit, an area for fluid flow of the air inlet decreasing from the air inlet opening to the air inlet exit, and
   ii) an anode nozzle provided with an inlet passage connected to an expansion opening, the inlet passage having an inlet passage inlet and an inlet passage outlet, an area for fluid flow of the expansion opening increasing from an inlet of the expansion opening located at the inlet passage outlet to an outlet of the expansion opening located at an outlet of the primary chamber, the air inlet exit of the air inlet leading to the inlet passage inlet, wherein a minimum cross-section diameter of the inlet passage is less than a cross-section diameter of the air outlet exit of the air inlet and less than a cross-section diameter of the inlet of the expansion opening; and
   a cathode spike with a tip at least partially inserted beyond the inlet passage inlet into the inlet passage; and
   generating an electric arc in the inlet passage between the tip of the cathode spike and the anode nozzle on a path of the primary air flow injected into the primary chamber via a primary air inlet of the primary chamber, so as to heat the primary air flow and create a heated primary air flow, wherein a secondary air flow is injected into a secondary chamber, wherein a first portion of said secondary air flow is said primary air flow, and wherein a second portion of said secondary air flow circulates in a heat exchange relationship with the heated primary air flow escaping from the primary chamber, the second portion of said secondary air flow having a lower temperature than the heated primary air flow at the outlet of the primary chamber.

16. The method as claimed in claim 15, wherein the second portion of the secondary air flow is greater than the primary air flow.

17. The method as claimed in claim 15, wherein the heated primary air flow is injected in a direction of the secondary air flow.

18. The method as claimed in claim 15, wherein at least one additional primary air flow is injected into an additional primary chamber and said at least one additional primary air flow is heated by another electric arc generated in the additional primary chamber, the at least one heated additional primary air flow exchanging heat with the secondary air flow.

19. The method as claimed in claim 16, wherein the heated primary air flow is injected in a direction of the secondary air flow.

20. The method as claimed in claim 16, wherein at least one additional primary air flow is injected into an additional primary chamber and the additional primary air flow is heated by another electric arc generated in the additional primary chamber thereby generating a heated additional primary air flow, the heated additional primary air flow being in an additional heat exchange relationship with the secondary air flow.

* * * * *